US009693137B1

(12) United States Patent
Qureshi et al.

(10) Patent No.: US 9,693,137 B1
(45) Date of Patent: Jun. 27, 2017

(54) METHOD FOR CREATING A CUSTOMIZABLE SYNCHRONIZED AUDIO RECORDING USING AUDIO SIGNALS FROM MOBILE RECORDING DEVICES

(71) Applicants: Haseeb Qureshi, Knoxville, TN (US); Jonathan Sexton, Knoxville, TN (US); Mark Montgomery, Pegram, TN (US)

(72) Inventors: Haseeb Qureshi, Knoxville, TN (US); Jonathan Sexton, Knoxville, TN (US); Mark Montgomery, Pegram, TN (US)

(73) Assignee: Audiohand Inc., Knoxville, TN (US)

( * ) Notice: Subject to any disclaimer, the term of this patent is extended or adjusted under 35 U.S.C. 154(b) by 0 days.

(21) Appl. No.: 14/943,641

(22) Filed: Nov. 17, 2015

Related U.S. Application Data (60) Provisional application No. 62/080,606, filed on Nov. 17, 2014.

(51) Int. Cl.
*H04R 3/00* (2006.01)
*G10L 21/0208* (2013.01)

(52) U.S. Cl.
CPC .......... *H04R 3/005* (2013.01); *G10L 21/0208* (2013.01)

(58) Field of Classification Search
CPC .................................................. H04R 3/005
USPC ................ 84/622; 348/14.01, 192; 356/477; 381/17, 71.12, 92, 97, 300; 463/43; 704/267, 275; 715/202, 723
See application file for complete search history.

(56) References Cited

U.S. PATENT DOCUMENTS

| | | |
|---|---|---|
| 6,122,668 A | 9/2000 | Teng et al. |
| 6,577,333 B2 | 6/2003 | Tai et al. |
| 6,934,461 B1 | 8/2005 | Strub et al. |
| (Continued) | | |

FOREIGN PATENT DOCUMENTS

WO    2012142518 A2    10/2012

OTHER PUBLICATIONS

Ballew, Aaron, et al., Fusion of Live Audio Recordings for Blind Noise Reduction, Proceedings of the 14th International Conference on Information Fusion, 2011.

(Continued)

*Primary Examiner* — Gerald Gauthier
(74) *Attorney, Agent, or Firm* — Luedeka Neely Group, P.C.

(57) ABSTRACT

A system and method for creating a synchronized audio signal having a variable sound perspective from a plurality of audio signals captured by mobile recording devices. The system includes an audio source for producing an audio signal, mobile devices for capturing the audio signal as audio recordings. The mobile devices are connected to a server via a communications network. The audio recordings are transmitted from the mobile devices to the server over the communications network. The server receives the audio recordings and saves them to a database. A mixer accesses the saved audio recordings and then aligns, mixes, and modifies them according to mixing instructions to produce a synchronized recording having a first sound perspective. A user may provide input to the server to generate new mixing instructions, and the mixer generates an updated synchronized recording having a second sound perspective in response to those new mixing instructions.

12 Claims, 10 Drawing Sheets

(56) References Cited

U.S. PATENT DOCUMENTS

| | | | |
|---|---|---|---|
| 7,512,886 B1* | 3/2009 | Herberger | G11B 27/034 715/723 |
| 7,526,348 B1 | 4/2009 | Marshall et al. | |
| 7,688,683 B2 | 3/2010 | Griner et al. | |
| 7,825,321 B2* | 11/2010 | Bloom | G10H 1/366 84/622 |
| 8,112,281 B2 | 2/2012 | Yeung et al. | |
| 8,194,884 B1* | 6/2012 | Johnston | H04S 7/30 360/70 |
| 8,848,925 B2* | 9/2014 | Tammi | G10L 19/008 381/17 |
| 9,111,580 B2 | 8/2015 | Kirsch | |
| 2006/0187860 A1 | 8/2006 | Li | |
| 2007/0094031 A1* | 4/2007 | Chen | G10L 21/04 704/267 |
| 2008/0137887 A1* | 6/2008 | Usher | H04S 5/02 381/300 |
| 2008/0211920 A1* | 9/2008 | Hamada | H04H 20/12 348/192 |
| 2008/0304678 A1* | 12/2008 | Chen | G10L 21/04 381/71.12 |
| 2009/0028347 A1 | 1/2009 | Duraiswami et al. | |
| 2009/0103100 A1* | 4/2009 | Froggatt | G01M 11/3172 356/477 |
| 2009/0299752 A1* | 12/2009 | Rodriguez | D06F 58/28 705/275 |
| 2012/0198317 A1* | 8/2012 | Eppolito | G11B 27/034 715/202 |
| 2013/0002797 A1* | 1/2013 | Thapa | H04M 3/002 348/14.01 |
| 2014/0086562 A1 | 3/2014 | Lassman et al. | |
| 2014/0187334 A1* | 7/2014 | Crossley | A63F 13/44 463/43 |

OTHER PUBLICATIONS

Ballew, Aaron, et al., Rayleigh-normalized Gaussian Noise in Blind Signal Fusion, Proceedings of the 16th International Conference on Information Fusions, 2013.

Wang, Avery Li-Chun, An Industrial-Strength Audio Search Algorithim, Shazam Entertainment, Ltd., Proceedings of the 4th International Conference on Music Information Retrieval, 2003.

* cited by examiner

METHOD FOR CREATING A CUSTOMIZABLE SYNCHRONIZED AUDIO RECORDING USING AUDIO SIGNALS FROM MOBILE RECORDING DEVICES

CROSS-REFERENCE TO RELATED APPLICATIONS

This application claims the benefit of U.S. Provisional Application No. 62/080,606, filed Nov. 17, 2014 and entitled METHOD AND APPARATUS FOR CREATING SYNCHRONIZED AUDIO FROM MULTIPLE RECORDING SOURCES, the disclosure of which is incorporated by reference herein in its entirety.

FIELD OF THE INVENTION

This invention relates to the field of processing of audio signals. More particularly, this invention relates to systems and methods of processing audio signals from multiple recordings of an event captured by discrete mobile recording devices to produce one or more synchronized audio recordings having variable audio characteristics.

BACKGROUND AND SUMMARY

Recorded music has historically yielded static, performer-focused recordings of a performances. These recordings are "performer-focused" because, ideally, the recorded sound on each track captures the performance of the musicians almost perfectly using on-instrument microphones or free-standing microphones that capture each musician. These recordings are then mixed by a sound engineer to create a single recording.

One of the challenges in combining multiple audio signals captured during the same event is ensuring that each track is correctly aligned in time with the other tracks. If a recording is unintentionally misaligned, even slightly, playing all recorded audio simultaneously produces undesirable auditory effects, such as audio that is reverberated or slap-delayed. Unless time corrected for the error in time alignment, the audio is typically rendered unusable and considered defective. One method for aligning multiple tracks is through the use of a master timekeeping device, such as a "master clock", that time stamps each of the tracks so that the tracks may be aligned based on those time stamps. However, high-quality clocking equipment is expensive and is often complicated to operate and requires advanced planning and setup. This means clocking equipment is usually not available to average consumers and is not ideal for causal, impromptu recordings of an event, leading to many performances not being recorded at all. Another method for aligning tracks is through manual manipulation using audio editing software. This is a time consuming and labor-intensive task that requires a sound engineer to manually manipulate each track individually. Again, this is not an ideal solution for average consumers making impromptu recordings of an event, who also may not have the required knowledge or expertise in making such adjustments.

After the sound engineer has finished mixing the recorded track, it is a single, static and unchanging recording that represents the idealized sound of the recording. In other words, it represents the sound that the performer or the producer would have wanted the audience to hear and remember. However, the sound in that idealized recording is not necessarily how the audience actually remembers the performance or remembers the experience of being present at the performance. The sound of the performance from the perspective of an audience member is often drastically different from the perfected, idealized professional recordings of that same performance. Unlike the engineer-created recording of a performance, an audience member cannot filter out the background or crowd noises. The audience is often located on all sides of the stage where the performance is taking place and, depending on their location, the sound of the performance might change. For example, an audience member on the left side of the stage may hear more or less of one instrument or voice than someone located on the right side of the stage, due to the stage and microphone setup.

With the introduction of digital mobile devices, individuals can now record music in order to capture a portion of a musical performance. However, there are limitations to these types of recordings. First, mobile devices are not equipped with the same type of professional recording equipment that is used in studio recording, so the quality of the recording itself is not as good as a professional recording. Also, recordings are limited in quality because, in contrast with a professional recording that has several microphones that each provide an audio recording signal, recordings made by mobile devices include only a single audio signal that is recorded by that one device. Also, picking up that signal is entirely dependent on the device's location and surroundings. If the acoustics in that location are poor, the recording will likely be poor. Also, mobile device recordings often do not represent an entire performance. Instead, because recording an entire performance is inconvenient for a single audience member, often only a segment of the event is recorded. Also, the limited battery life and limited memory of mobile devices might limit the amount of a performance that can be captured by a single mobile device. Further, due to the unpredictable location of the recording device, intermittent or constant background noise may be a considerable part of what the microphone picks up. Lastly, due to the unpredictable location of the device with respect to the performers, the signal may feature primarily only one musical instrument or voice that is nearer to the device and, for the most part, exclude other instruments or voices that are further away.

Another limitation of the single recordings made by mobile devices, as well as traditional professional recordings, is that they are static recordings. Professional recordings have one sound "perspective" that is typically performer-focused and typically balances the sound of the performers almost perfectly while minimizing background and crowd noise. A single mobile device recording also has a single sound perspective that represents what that particular audience member heard from that particular recording location at that particular time. Hearing the same event from a different perspective will drastically change the experience as a whole. For example, an audience member that was located on the back row might want to hear the performance from the front row. In another example, an audience member that was seated near one singer or instrument might want to experience the event near a different singer or instrument.

Accordingly, there is a need for a system and method that enables observers at an event, such as a speech or live concert, to quickly and easily capture portions of audio from that event, to combine, synchronize, align and process those separate recorded audio signals to generate one or more combined recorded signals, and to customize the audio characteristics of those combined signals based on user input to vary the sound perspective of the recording, without the need for expensive audio processing equipment or a time-consuming equipment setup process, and to make those combined recorded signals available for playback quickly to others, at almost any location with a device as compact as a mobile device.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

This invention enables a group of individuals that are observing an event to collaboratively produce a single sound recording of that event by combining multiple sound recordings of portions of the event that are captured by the individuals using mobile devices. That recording may be modified by the users to replicate the sound of the event from multiple perspectives.

Figure 1:
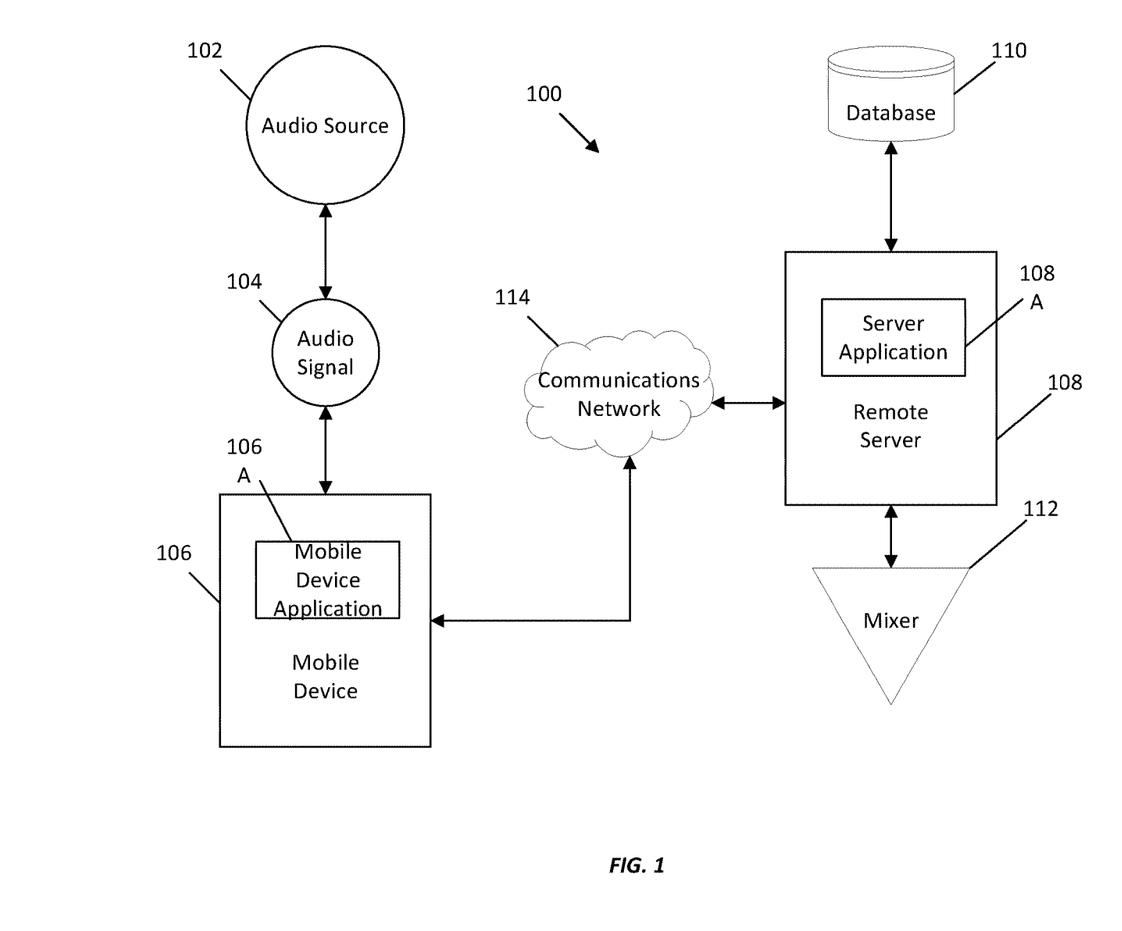
FIG. 1 is a schematic diagram of a system for creating synchronized audio signals using audio signals captured by mobile recording devices according to one embodiment of the present invention.

With reference to FIG. 1, the system 100 includes at least one audio signal source 102 for producing an audio signal 104, a plurality of mobile devices 106 running a mobile device application 106A and having a recording means for capturing and recording the audio signal as audio signal recordings. There is a remote server 108, such as a cloud server running a server application 108A that is configured to receive and process the audio signal recordings. The server 108 is in communication with a database 110 that is configured to store audio signal recordings and a mixer 112 that is configured to modify and mix audio signal recordings. The mobile devices 106 may be connected to the server 108 via a communications network 114, such as the Internet, wherein the audio signal recordings are transmitted from the mobile devices to the remote server over the communications network. Preferably, the mobile devices 106 are connected to the communications network 114 when the recordings are made, but they may also make recordings without Internet connectivity. In that case, transmission of the recordings from the mobile device 106 would occur once Internet connectivity was re-established. The discussion below assumes that the mobile devices 106 are connected to the communications network 114 at all times.

As discussed above, consumer grade (i.e., non-professional) recording devices, such as those found in mobile telephones or tablet devices, produce audio recordings having limited sound quality. However, using the presently-described system 100, as the number of mobile devices 106 increases and, therefore, as the number of sound recordings increases, a higher quality combined recording may be produced. The system 100 sums the various audio recordings or perspectives in order to produce a recording having a higher resolution and better audio quality than any single audio recording. For this reason, it is preferable that the sound recordings be captured by mobile devices that are easily transportable and are ubiquitous in order to maximize the number of audio recordings that are possible.

As used in this discussion, the term "server" may include one or more devices that can communicate with or comprise a database and data storage and that can further communicate with the mobile devices via the communications network. The server 108 can be analogized as a factory, where all of the various pieces, included the audio recordings, come together and are assembled to form the synchronized audio recording. The remote server 108 may comprise a cloud-based server, such as Amazon Web Services (S3) or Microsoft Azure Data Storage. The term "mobile device" refers to mobile phones, tablets, etc., and may include other devices having audio recording capabilities and access to the communications network 114. These devices 106 are ideal for this system 100 because they are simple to use, highly mobile, and relatively inexpensive. Also, a large portion of any group of people would be expected to have these types of mobile recording devices at any given event. This provides an opportunity for a large number of recordings from different perspectives to be made of the event. The recorded audio can be either mono or stereo audio and at any bitrate or sampling rate.

Figure 2:
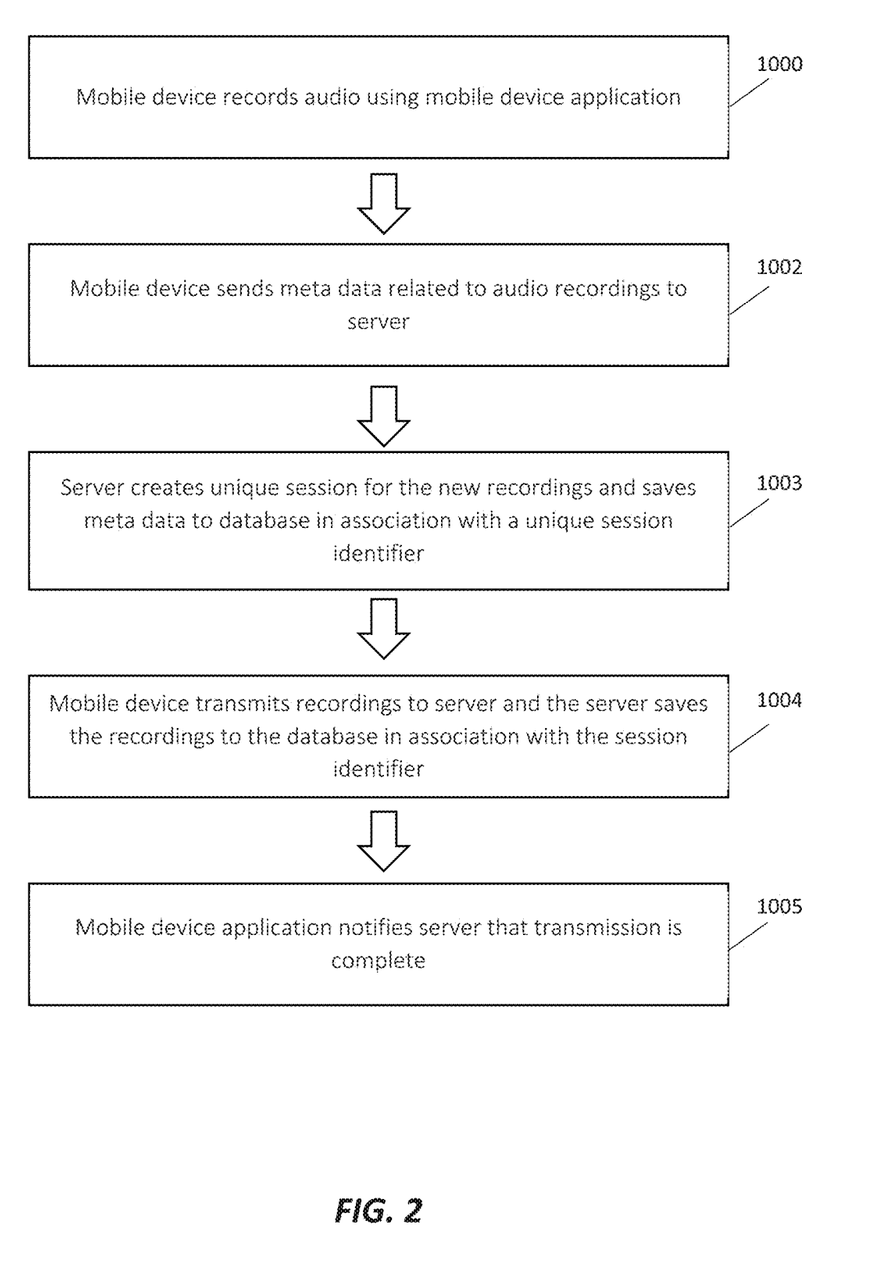
FIGS. 2-4 are flowcharts illustrating a method for creating synchronized audio signals using audio signals captured by mobile recording devices according to one embodiment of the present invention.
Figure 3:
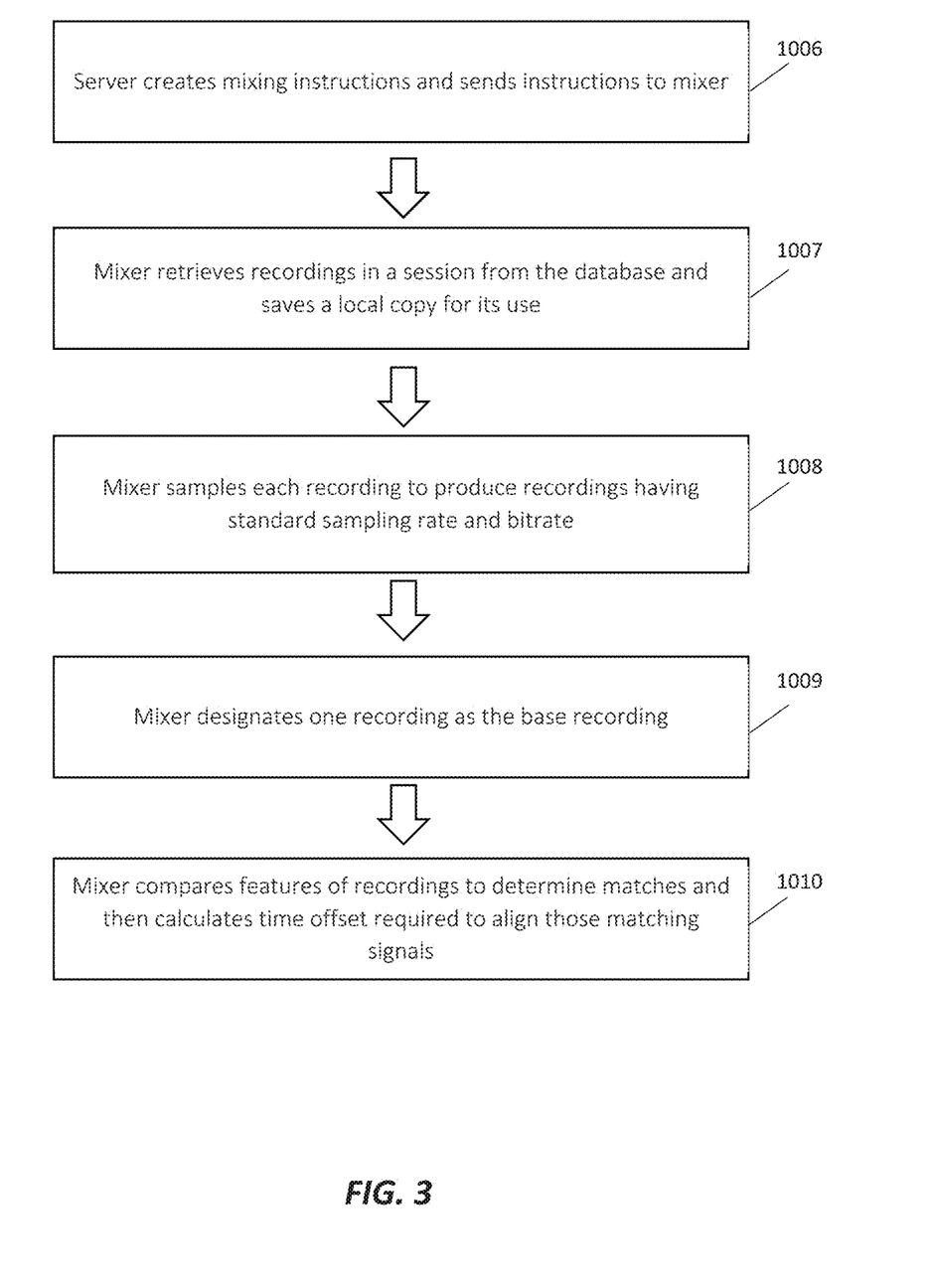
Figure 4:
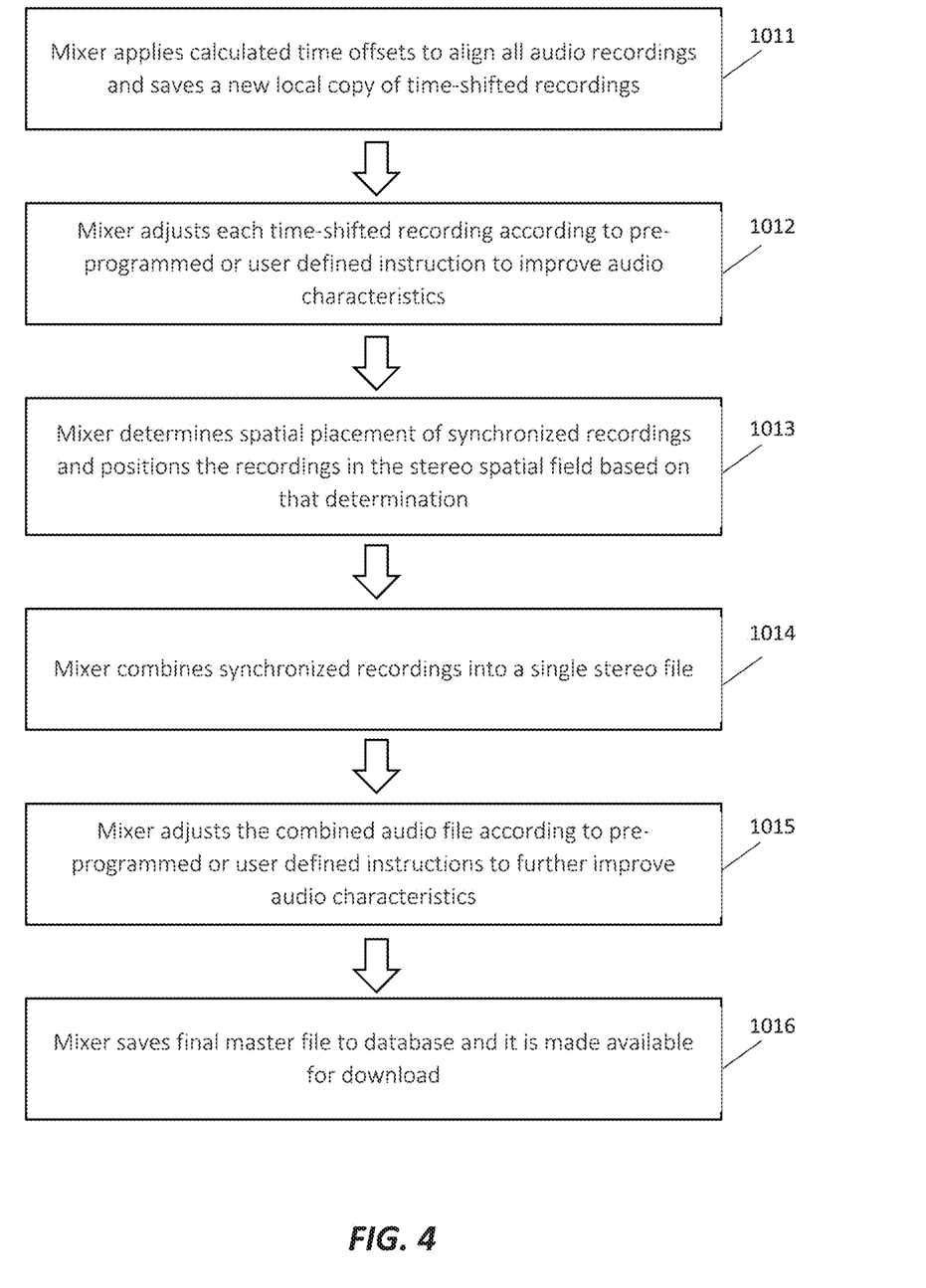
Figure 5:
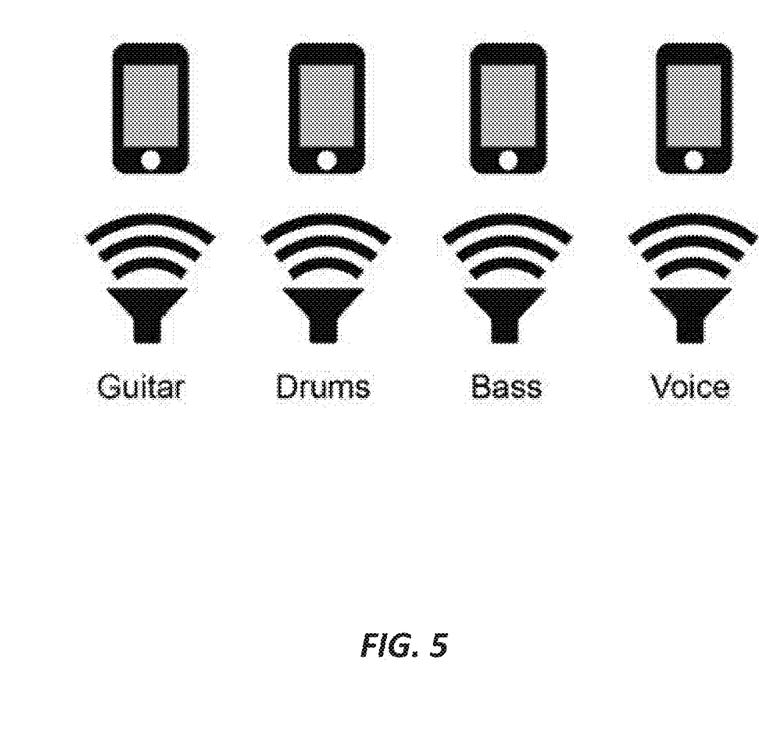
FIG. 5 is a schematic diagram demonstrating a plurality of audio signal sources providing audio signals that are each captured and recorded by a separate mobile device.

As shown in FIGS. 2-4, after an audio recording is created (Step 1000), the mobile device application sends a notification, which may include meta data associated with the recording, informing the server 108 that a new recording has been made (Step 1002). In response to this notification, the server 108 creates a new a session object having a unique session identifier (Step 1003). A session object is a collection of all associated audio recordings, and they keep track and maintain the relationship of each of the recordings so that there is no confusion as to which performance or event each audio recording has captured. Once the server 108 receives a notification of a new recording and creates the session object, additional meta data may be passed to the server, associated with that session using the session identifier, and saved to the database 110. That meta data includes, for example, when the recording was created, its duration in seconds, and name or description, and how each audio recording is related to other audio recordings. Sessions contain the necessary meta data that allow the system to generate new mixes, or blending, using all related audio recordings. A session may also contain explicit audio mixing instructions.

The audio recordings and associated meta data may be stored locally on each mobile device 106. Once the session has been created, the mobile device application instructs the mobile device 106 to transmit the audio recordings to the remote server 108 so that copies are stored on the device and on the remote server (Step 1004). Later, other audio recordings, including blended or mixed audio recordings that have been processed by the system 100, may also be stored on the remote server 108. This allows those recordings to be quickly and easily transmitted from one device to another device and to be saved on those mobile devices 106. For example, after a synchronized audio file has been created using this system 100, it may be stored on the remote server 108 and then delivered to multiple mobile devices 106. The synchronized audio file may also be transmitted to devices having no recording capabilities and that are simply used for listening or manipulating the data. After the sound recordings are captured and transmitted to the server 108, the mobile device application sends a notification that the upload has finished (Step 1005).

The system 100 is activated and begins to apply the processes described below as audio recordings are uploaded to the server 108. Uploading a new recording re-triggers the processing, and thereby creates a new resulting mix. Theoretically, if there were 100 recordings uploaded consecutively, the system would try and create 100 different mixes, where the last mix is the sum of all 100 recordings. However, in order to prevent this unnecessary computation, the system mixer 112 delays the processing step after an audio recording is uploaded such that additional recordings may be uploaded before they are all processed. If the time delay elapses without additional audio recordings being uploaded, the processing step begins. If a new recorded is uploaded before that delay elapses, the delay restarts. Also, if the processing steps has begun and a recording is later uploaded, the delay restarts. is longer for longer recordings. The amount of time of the delay can be varied. Preferably, the system 100 updates the delay automatically so that longer audio recordings result in a longer delay. An advantage of this is that longer recordings may require a longer amount of upload time. If the delay did not account for this lengthy upload time, the delay could expire before a single large file has been completed uploaded.

Once all of the audio recordings from all of the various mobile devices 106 associated with a particular session have been transmitted and saved to the database 110, the server application 108A creates a set of mix instructions for mixing the audio recordings together and these instructions are then sent to the audio mixer 112 (Step 1006). A single session may include a variety of instructions, which each generate different mixes using a different set of audio processing instructions. The instructions may also include instructions to provide a postback to the server 108 which informs the server of the status of mix. This status may then be passed to a user.

The mixer 112 reads the instructions and manipulates the recordings according to those instructions. In particular, one function of the audio mixer 112 is to programmatically align the audio recordings so that each of the recordings wherein they are placed into the correct time order and are synced with one another. As a first step in this process, the mixer 112 may pull each of the recordings associated with a particular session and save a local copy to disc space of the mixer 112 (Step 1007). This will result in faster data processing times. However, the mixer 112 may operate with copies saved to the database 110. Each of the audio recordings are then sampled by the mixer 112 to produce high quality recordings having a standardized sampling rate and bitrate (Step 1008).

The mixer 112 then selects an audio recording from received mix instructions and arbitrarily designates the recording as the base recording (Step 1009). The remaining audio recordings may be placed into correct time order by applying a calculated time alignment offset. A time alignment offset is the time difference required to manipulate a first audio recording so that at least a portion of the first audio recording and at least a portion of a second audio recording are in unison when played at the same time with minimal to no audio signal phase.

Typically, in recording pro audio and producing studio quality music, it is industry standard to try and reduce as much noise bleed between multiple microphones as possible. Bleed occurs, for example, when one microphone that is dedicated to capture one instrument but picks up the sound of another instrument. It is typically industry practice to try and reduce bleed as often and as much as possible because it is typically regarded as undesirable. As such, most albums and records are created by musicians recording each instrument over a metronome, and effectively layering all instrumentation within a session or mix. This provides strict separation of instrumentation having recorded audio tracks that are strictly devoted to one instrument, voice, etc. However, some musicians and artists prefer to record their songs as a group, where each instrument or voice is recorded by multiple microphones that are simultaneously capturing the event. Even then, sound engineers typically try and isolate these microphones as best as possible, and in this case inevitably some level of bleed occurs.

By contrast, this system 100 encourages bleed between the multiple recording devices 106 recording the one event, even if each such device is closely recording an instrument or voice. The changes in amplitude, wavelength and frequency give each audio signal a unique signal or profile. By using the bleed between the devices' 106 resulting audio, this system 100 is able to determine similar audio hit points in the audio profiles of the audio recordings. This allows the system to then match up coinciding portions of multiple audio recordings, based on these hit points, and then calculate the time alignment required to correctly align the signals (Step 1010), again to achieve minimal or zero audio signal phase. In signals processing, time alignment offsets are often obtained using a process of matching peaks and valleys over time and frequency domains and the offset is located where there is the maximum cross-correlation between two or more signals. There are a number of known audio alignment methods and the precise method used in this system 100 is irrelevant as long as the process yield accurate and repeatable results. Also, there are algorithms whose challenge is to average the profile of any recorded audio, so that the underlying music may be "matched." The system 100 differs in that its audio analysis must not be averaged or blurred, which blurring would lead to inaccurate time alignment offset and undesirable audio effects when playing all recorded audio in unison.

In this particular example, the mixer 112 analyzes each audio recording's spectrograph over small snapshots of time (e.g., 10 milliseconds-800 milliseconds). The mixer 112 then identifies the key features that represent each snapshot, normalized over frequency bands, with particular focus on mid-range frequencies between 500 kHz and 2,000 kHz. This is where the majority of audible sound occurs, and yields the best performance and predictable sound analysis, however any frequency bands can be used. This is something that may be tweaked within the system to adjust computational power consumption. The mixer 112 then compares each recorded audio recording's series of snapshots over the axis of time. The system 100 will continue to broaden its search in order to locate a match between signals until a match is found or until it determines that there is no match. After finding any series of matching snapshots, the mixer 112 calculates the appropriate time delays for each of those snapshots.

If any time alignment offset equal to zero, that is an indication that the other recording was not recorded at the same event and, therefore, does not belong in same set with other recordings. The system 100 relies on audio bleed to ensure that each audio recording contains some of the same recorded audio from other audio recordings from the event. Time alignment involves three domains: analysis over the time domain, frequency domain, and the power of the signal at that precise moment. There are typically over 40,000 frequency snapshots captured every second. Assuming that there are 20 frequency bands, on which spectral information analyzed, this could potentially result in 800,000 points of information per second of the recording. Each of these is potentially a reference point that can be used to verify that each audio recording was actually made at the same event. As a result, it is practically impossible to record an audio event with two microphones and have absolutely no alignment between the two signals. Accordingly, whenever the system 100 finds zero phase without system correction, it is presumed that the two recordings were not of the same event.

The mixer 112 repeats the above process to determine a calculated time alignment for each of the recordings associated with a particular session. Once all of the time alignments have been calculated, the mixer then applies the calculated time alignment by either adding or subtracting the calculated time onto the beginning of each audio recording other than the base recording and creates a new local copy of each time-shifted audio recording where the time alignment has been applied (Step 1011). The end result of this process is that each time-shifted audio recording is fully phase aligned with the other related audio recordings such that the signals' audio peaks and valleys are in unison, thereby providing a more cohesive and powerful sound than would be possible with a single audio recording made by a mobile device 106, minimizing any audio signal phase that could potentially weaken the summed audio. Thus, the audio recordings for a given session can be aligned without the need for a master timekeeping device.

Processing each audio recording may be computationally costly and time intensive, especially for a large number of audio recordings. For example, without any metadata, the system must analyze each audio signal, which is extremely taxing on any server running the computation. After analyzing each audio signal, the process of then comparing the two between each other produces a lengthy process. This computation process becomes redundant and necessary once a match has been identified. In a long recording, the system might find hundreds or thousands of time alignment matches. To prevent this from occurring, metadata is used to limit the breadth of the analysis. Instead of analyzing the full length recording, the system 100 analyzes only a portion (e.g., the first few seconds) of each recording. This "enveloping" process significantly reduces the amount of time required to find a matching recording.

Using this methodology, the system 100 is able to significantly reduce is computational load. These time and computational savings become even more apparent as the number of recordings being analyzed increases.

The synchronized audio recordings are then processed by the mixer 112 to improve the sound quality according to a pre-programmed set of instructions or user input before they are made available for playback (Step 1012). For example, the mixer 112 analyzes various characteristics of each recording, including the average loudness for the entire recording and average loudness by frequency for the entire recording. The mixer 112 then alters the sound of each time-shifted audio recording. This may include, for example, manipulating the audio gain and volume and applying any equalization necessary to achieve better sounding audio characteristics.

The mixer 112 then determines the spatial placement for each of the time-shifted audio recordings using the recording's characteristics (Step 1013). By identifying the delay effect of signal recorded by devices 106 placed at various positions relative to the sound source 102, the combination of this time offset and or with the sound characteristics, such as volume and frequency domain, can be used to enhance or reduce echo, reverb and a listener's perception of space. In one example, recordings with higher volumes and less fluctuation in volume are placed in the center of the stereo spatial field. Recordings with more fluctuation in volume may be balanced against each other and placed opposite from each other in the stereo spatial field, so that they are placed more left and right of the center of the field.

After processing each of the time-shifted audio recordings in the above-described manner, the mixer 112 takes all processed recordings and proceeds to sum them into one stereo audio file (Step 1014). This process is typically referred to as "mixing" in the recording industry, and is also considered to be "post-production". This process can also entail another process referred to as "mastering", which is taking one stereo track that already is the summation of multiple audio recordings and applying subtle audio filtering to enhance the sound, such as adding more bass or reducing treble, and boosting volume wherever the mixdown may be too quiet.

As such, the mixer 112 then determines what further audio processing may be required to further improve the quality of this single combined stereo audio file (Step 1015). The same types of audio processing steps applied to the individual time-shifted audio recordings, discussed above, as well as other processes, such as applying sound effects such as reverb, may also be applied to this single combined stereo audio file. For example, the mixer 112 may filter the combined recording to reject local noise appearing on one mobile device's audio recording but not another or, alternatively, noise that occurs for a certain time period. This is accomplished by tracking common signal waveforms and temporarily rejecting uncommon noise that is not found across the aligned sound recordings. For example, there may times where a particular audio recording fails to produce the best sounding audio capture of that performance. This may be due to any unexpected or background noise created in the vicinity of the mobile device, such as surrounding venue attendees or feedback. By statistically weighing the audio parts at any given time, to understand what is the average sound of the performance, outliers or sound spikes and deviations from the combination process can be filtered out. On the other hand, a user may choose not to filter those sounds. This system allows a user to decide what kind of immersive experience he or she wishes to have, at any musical event that is recorded.

Once the mixer 112 has applied any further processing, the processed stereo audio file is saved locally as a master audio file and then this file is uploaded to the database 110 and is made available for download (Step 1016). Preferably, this file is saved at quieter volumes that the time-shifted audio recordings in order preserve the headroom of the recording in order to improve the overall sound of the recording. The mixer 112 may also optionally render the master audio file in various formats, such as MP3 format or upload the master to the database 110 in compressed format in order to facilitate download and playback. The mixer 112 may also optionally upload audio byproduct to the database 110. Mixer 112's byproduct is a mix of sound elements. One byproduct is a better, cleaned-up version of each recorded audio file. This has noise reduction, gain control, and other sonic enhancements that make it desirable on its own, without being summed into the whole. Another potentially useful byproduct is the sum of all recorded tracks, before mastering. Typical in the music industry, mastering (the final audio volume and equalization polishing) is done at established studios with physical hardware, specifically created to treat the sound. Using part of the system's byproduct allows any creator of audio to then send their byproduct to a proper mastering facility. In other words, the system's byproduct consist of intermediary audio renderings, that can be later used to integrate with traditional recording techniques and processes.

Using this system in conjunction with traditional recording techniques can lead to desirable audio products, that can be greatly monetized. For instance, any stadium concert can use this system to capture the audience with such clarity and detail, that cannot be attained by traditional recording techies or equipment.

The mixer 112's byproduct can be later mixed into a traditional DAW (Digital Audio Workstation) to be combined with any traditionally recorded audio, to achieve a higher resolution of recorded audio perspective.

The prior local copies are then deleted from the mixer 112 and the mixer is ready for a new set of mixer instructions for a new mix. Preferably, the system 100 provides sharing mechanisms for system users, to disseminate recordings or processed set of recordings including, for example, by means of email, text messaging, and social sharing.

By having access to audio recordings that represent multiple points of view of an event, and using previously mentioned data on each recording, the system 100 provides users with the ability to experience the event from a user-defined vantage point. In particular, following the initial processing steps discussed above, the sound characteristics of the combined sound recording may be varied by a user to replicate experiencing the event from various points of view or sound perspectives. In particular, the system can selectively combine audio recordings from various spatial locations to create an audio recording with a customized spatial perception. Based on the user's choices, new instructions are provided by the server 108 to the mixer 112, which then reprocesses the additive summation of the individual audio recordings to represent and simulate a user's desired location or point of view.

For example, after hearing the initially created recording, the user might desire to shift the audio perspective in the stereo spatial field. By adjusting the levels of the time-shifted audio recordings, based on their placement on the stereo spatial field, these adjustments can be made. For example, a first synchronized recording presents a perspective of someone located at the center of a concert hall. A user provides instructions to the server to generate a new second synchronized recording that presents a perspective of someone located at the left, right, or back of the concert hall. In response to these instructions, the server 108 will generate new mixing instructions which are passed to the mixer 112. The mixer 112 uses the steps discussed above to generate this new recording.

The mixer 112 can also take all of the recordings in each session, and group them into notable vantage points that can then be delivered to the device application 106A, which then provides a user with the "joystick" control of experiencing different perspectives of the event, without expensive or time-costly further processing of the associated recordings. For i.e., the mixer 112 may find up to 12 vantage points for a stadium performance, and will then render 12 different stereo files, with each file representing the recordings that highlight that vantage point. The smartphone app then retrieves all 12 audio files, and can then provide the user with real-time shifting in audio perspective, allowing for a fully immersive audio experience. An immediate application for the mixer 112 processing these vantage points is for virtual reality headsets and video content.

Unlike traditional records, which are static and provide only a single sound perspective, the audio recording created by this system may be a dynamic and may change according to a user's input. In a second example, a combined recording of a live concert taking place on a stage might replicate experiencing the concert from the perspective of someone located near the right-hand side of the stage. This is accomplished by emphasizing, in the combined recording, those sounds that originated from the right side of the stage and de-emphasizing those sound recordings that originated from the left side of the stage. The user may then selectively modify the combined recording to replicate experiencing the concert from the perspective of someone located near the left-hand side of the stage. Again, the modified combined recording would emphasize those sound recordings that originated from the left side of the stage and de-emphasize those sound recordings that originated from the right side of the stage. The combined recordings may be further modified to replicate experiencing the concert from a perspective where no recordings were taken by combining the other sound recordings. For example, the combined recording may replicate experiencing the concert from directly in front of the stage, even if no recordings were made there, by combining sound recordings taken on the left and right sides of the stage.

The system collects subjective feedback from users, judging the perceived quality and value of processed sets of recordings for ongoing learning. Using this feedback mechanism, the system is able to start learning which factors are correlated with achieving certain quality and style of created audio. This in turns allows the system to give instant feedback to users who are recording audio, so that, for any set of actors or particular user, location, environment, and or device placement may be optimized or used to complement existing sources being tracked. For example, after hearing the initially created recording, the user might desire to shift the audio perspective in the stereo spatial field. By adjusting the levels of the time-shifted audio recordings, based on their placement on the stereo spatial field, these adjustments can be made. For example, a first synchronized recording presents a perspective of someone located at the center of a concert hall. A user provides instructions to the server to generate a new second synchronized recording that presents a perspective of someone located at the left, right, or back of the concert hall. In response to these instructions, the server 108 will generate new mixing instructions which are passed to the mixer 112. The mixer 112 uses the steps discussed above to generate this new recording.

In operation, the mobile devices capture sound recordings of an event, preferably from and at different times during the event, which are then sent to the server 108. The server application 108A aligns and combines those recordings to produce a single synchronized recording that is formed by synchronizing, layering and blending the multiple recordings together. This blended recording representing a single perspective of that recorded event is then delivered to users for playback. With enough audio recordings, the synchronized recording will be played back without any gaps or silence. Users may then provide input to modify how those various recordings are layered and blended to produce a new synchronized recording that represents a different perspective.

Additionally, by combining the synchronized recordings with the biorhythms, such as heart rates, of those users making the recordings, as well as other metadata including geolocation or micro-geolocation; accelerometer or gyroscope readings; climate readings; light readings; the system allows for better understanding of the audience at various points during the event. This information may be obtained, for example, by means of wearable technology, such as a smart watch, or through sensors located on the mobile device. Measurements from these devices may be taken and associated with the recordings as they are made. Preferably, the system allows the measurements to be tracked and correlated in time with the audio recordings.

This recorded metadata, along with other data such as ticket sales, could allow performers or venues to create or select content that is specifically tailored for its audience or the venue's goals. For example, conducting an analysis of this data lead to a greater understanding regarding which performers produce a desired crowd reaction and or ticket sales performance goals. Such understanding and visualization of data may be used in a way that further refines the data, by placing qualifying metrics that help better translate any quantitative analysis to the application of any interested parties using such data.

Another benefit of obtaining the recorded data is that the system may be programmed to provide the user with information or feedback regarding the recording. For example, the user may be provided with instruction for maximizing the quality of the recording, such as how to reposition the mobile device. Analyzing this data may also enable venues to produce better sounding audio and acoustics. The recorded audio and the location of each mobile device may be correlated to determine locations within a particular venue where improvements to the sound quality should be made.

Figure 6:
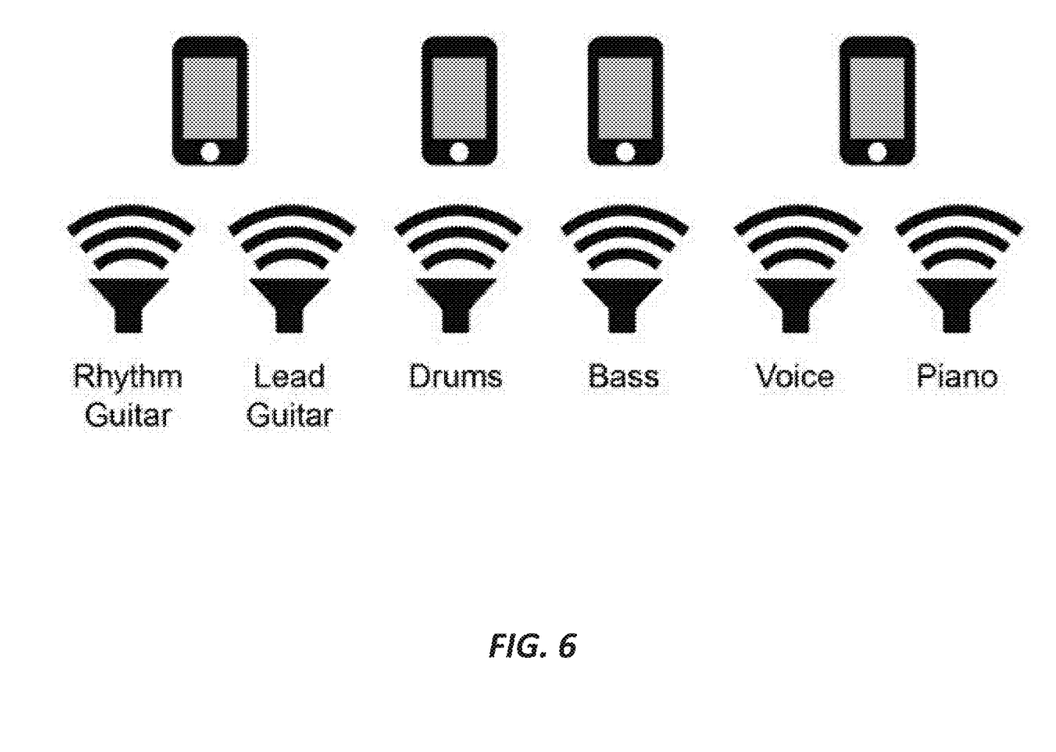
FIG. 6 is a schematic diagram demonstrating a plurality of audio signal sources providing audio signals where one mobile device is used to capture and record two or more audio signals.
Figure 7:
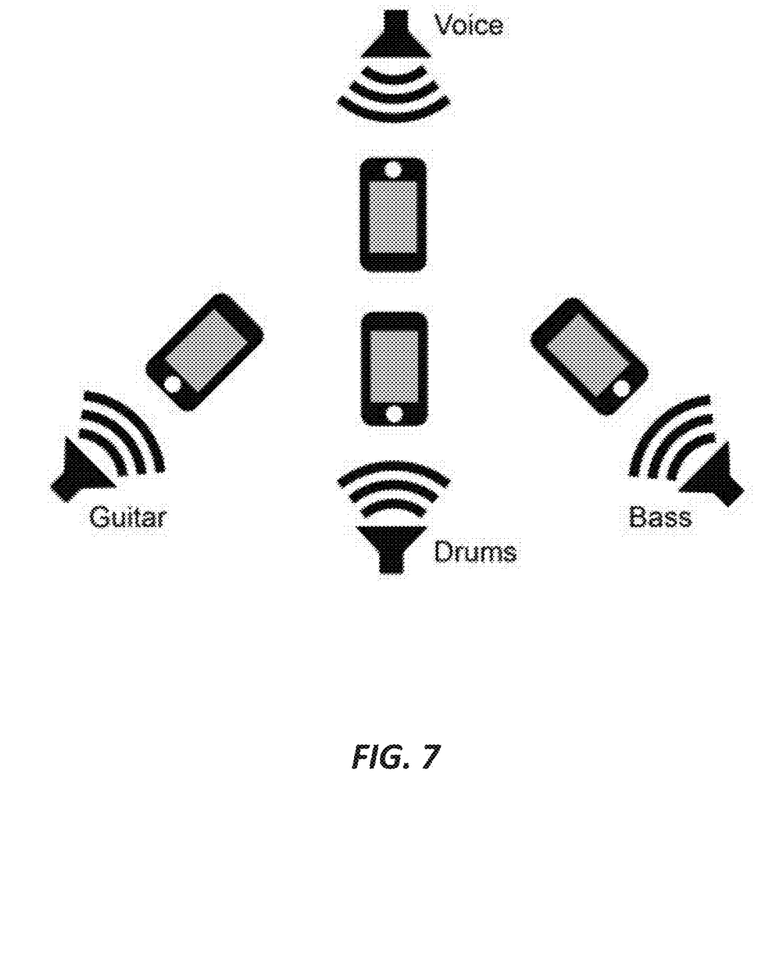
FIG. 7 is a schematic diagram demonstrating a plurality of audio signal sources placed in various geo-spatial locations with respect to a plurality of mobile devices.
Figure 8:
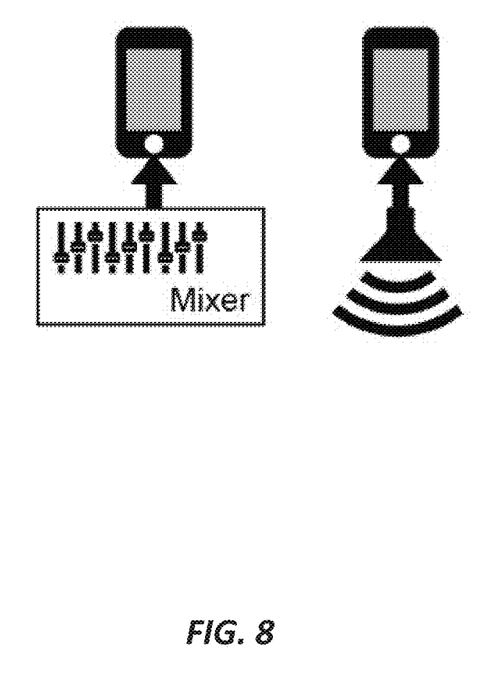
FIG. 8 is a schematic diagram demonstrating audio signals being input directly into and recorded by mobile devices.
Figure 9:
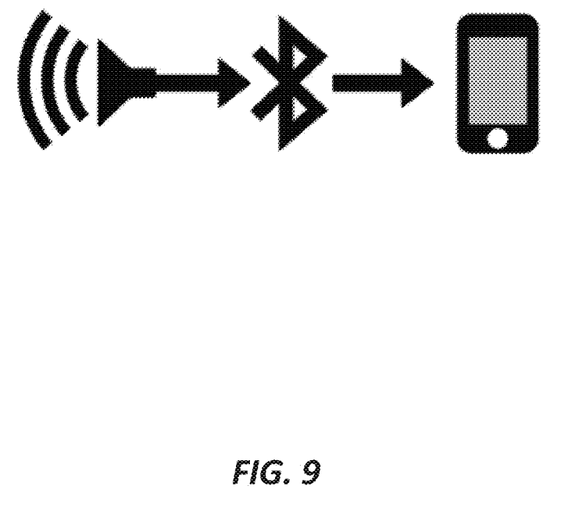
FIG. 9 is a schematic diagram demonstrating audio signals being transmitted to a mobile device over a wireless or Bluetooth connection.
Figure 10:
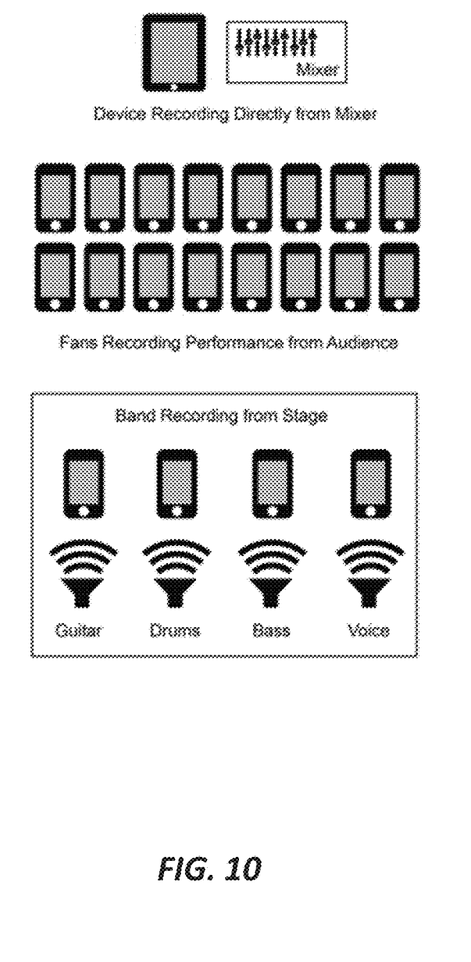
FIG. 10 is a schematic diagram demonstrating audio signals from three different sources, including a mixer, audience members, and performers, being contributed to a single synchronized audio recording.

Finally, FIGS. 5-10 demonstrate a number of alternative methods of using the system. In particular, FIG. 5 demonstrates the use of a plurality of audio signal sources providing audio signals that are each captured and recorded by a separate mobile device. FIG. 6 demonstrates a plurality of audio signal sources providing audio signals where one mobile device is used to capture and record two or more audio signals. FIG. demonstrates a plurality of audio signal sources placed in various geo-spatial locations with respect to a plurality of mobile devices. FIG. 8 demonstrates audio signals being input directly into and recorded by mobile devices instead of being recorded over the air by the audio recording components. FIG. 9 demonstrates audio signals being transmitted to a mobile device over a wireless or Bluetooth connection. FIG. 10 demonstrates signals from three different sources, including a mixer, audience members, and performers, being contributed to a single synchronized audio recording.

The foregoing description of preferred embodiments for this disclosure have been presented for purposes of illustration and description. They are not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the invention in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A method for creating a synchronized audio signal having a variable sound perspective from a plurality of audio signals captured by mobile recording devices, the method comprising the steps of:
    providing two or more mobile recording devices that are each configured to send and receive information wirelessly over a communications network;
    recording at least a portion of an event to a memory of the mobile recording devices using an on-board microphone to generate an audio signal, wherein each audio signal has an audio profile;
    transmitting the audio signals from each of the mobile recording devices to a server;
    receiving at the server the audio signals transmitted from the plurality of mobile recording devices;
    using a mixer that is in communication with the server, comparing the audio signals and identifying at least two audio signals wherein at least a portion of the audio profiles are substantially identical;
    using the mixer, determining a first time misalignment between the substantially identical portions of the at least two audio signals;
    using the mixer, applying a first time shift to one or more of the at least two audio signals based on the first time misalignment;
    using the mixer, mixing the time-shifted at least two audio signals to generate a first synchronized audio signal having a first sound perspective.

2. The method of claim 1 further comprising the step of delivering a copy of the first synchronized audio signal to an audio playback device.

3. The method of claim 1 further comprising the step of re-mixing the time-shifted at least two audio signals using the mixer to generate a second synchronized audio signal having a second sound perspective that is different from the first sound perspective.

4. The method of claim 1 further comprising the step of using the mixer to identify local noise present in one of the at least two audio signals but not present in the other one of the at least two audio signals and to filter the local noise out of the first synchronized audio signal.

5. The method of claim 1 wherein the mobile recording device is operable to function as a mobile telephone having a microphone.

6. The method of claim 1 wherein each of the at least two of the audio signals includes bleed over audio from the other of the at least two audio signals and wherein at least a portion of the substantially identical portions comprises the bleed over audio.

7. The method of claim 1 further comprising receiving mixing instructions from a user transmitted to server via the communications network and mixing the time-shifted at least two audio signals user the mixer, which is remote from the user, according to the mixing instructions.

8. The method of claim 1 wherein each audio profile is comprised of the amplitude, frequency and time of the audio signal.

9. The method of claim 1 wherein the audio signals are transmitted from the mobile recording devices to a server that is remote from the mobile recording devices wirelessly via a communications network.

10. A system for creating a synchronized audio signal having a variable sound perspective comprising:
- two or more mobile recording devices, each having a microphone, and that are each configured to generate a recording of at least a portion of an event using the microphone, where the recording has an audio signal having an audio profile;
- a server configured to receive the audio signals from the two or more recording devices;
- an audio signal mixer that is in communication with the server and that is configured to (i) compare the plurality of audio signals and to identify at least two of the audio signals wherein at least a portion of the audio profiles are substantially identical, (ii) determine a first time misalignment between the substantially identical portions of the at least two audio signals, (iii) apply a time shift based on the time misalignment to time align the substantially identical portions of the at least two audio signals such that the at least two audio signals are in unison, and (iv) mix the time-shifted at least two audio signals to generate a first synchronized audio signal having a first sound perspective that is the result of mixing the audio profiles associated with the time-shifted at least two audio signals.

11. The system of claim 10 wherein each audio profile is comprised of the amplitude, frequency and time of the audio signal.

12. The system of claim 10 wherein each of the two or more mobile recording devices has a transmitter and is configured to transmit the recording wirelessly over a communications network to the server using the transmitter.

* * * * *